United States Patent [19]

Nakatani

[11] Patent Number: 4,807,046
[45] Date of Patent: Feb. 21, 1989

[54] COPIER

[75] Inventor: Munehiro Nakatani, Osaka, Japan

[73] Assignee: Minolta Camera Kabushiki Kaisha, Osaka, Japan

[21] Appl. No.: 160,345

[22] Filed: Feb. 25, 1988

[30] Foreign Application Priority Data

Feb. 26, 1987 [JP] Japan .................................. 62-41429

[51] Int. Cl.⁴ ............................................. H04N 1/393
[52] U.S. Cl. ..................................... 358/287; 358/280
[58] Field of Search ................................ 358/287, 280

[56] References Cited

U.S. PATENT DOCUMENTS 4,731,658  3/1988  Koseki .................................. 358/287
4,734,786  3/1988  Minakawa ............................ 358/287

Primary Examiner—Howard W. Britton
Attorney, Agent, or Firm—Burns, Doane, Swecker & Mathis

[57] ABSTRACT

This invention relates to a copier to obtain image signals by scanning an original image by an image sensor, and to copy the image on a copying paper by a recorder after subjecting the image signals to the reduction processing, and the copier of this invention is designed in such a way as to obtain reduction image signals by sampling the image signals, which are obtained by reading the original image, in accordance with the reduction rate, to write these reduction image signals in an image memory, and to copy the image on a copying paper by the recorder by reading out the stored data from the image memory, having a calculating circuit to calculate write addresses of the reduction image signals in the image memory according to the reduction rate and the copying paper size, whereby the obtained reduction image signals are supplied directly to the recorder without resort to a large sized processor which carries out the reduction processing and the editing processing, the original image is copied correctly on the copying paper according to the reduction rate, and the entire size of the equipment can be reduced.

10 Claims, 7 Drawing Sheets

(a) LINE SYNCHRONIZING SIGNAL (b) IMAGE REGION ON THE CCD PICTURE ELEMENT

(c) ADDRESS BY 1.0 TIME CLOCK (d) IMAGE MEMORY ADDRESS (e) ADDRESS BY 0.5 TIME CLOCK

(f) IMAGE MEMORY ADDRESS (SEE FIG. 5(a))

(g) IMAGE MEMORY ADDRESS (SEE FIG. 5(b))

AN A4 COPYING PAPER
IN VERTICAL POSITION

FIG.5(a)

AN A6 COPYING PAPER
IN VERTICAL POSITION

COPIER

BACKGROUND OF THE INVENTION

1. Field of the Invention

This invention relates to a copier to read an original image by an image sensor composed of charge couple device (CCD) and others, and to copy it on a copying paper by a printer such as a laser beam printer.

2. Description of the Prior Art

In a conventional copier, image signals read by an image sensor have been binary-coded, supplied to a laser beam printer or the like and copied on a copying paper. In this process, in order to perform reduction, enlargement and editing of the image to be copied, the image signals have been ordinarily entered in a computer, and subjected to the processing of reduction, enlargement and editing of images for a page to be copied on a bit map memory, and thus have been supplied to the printer.

Using a computer for processing image signals has been effective to enhance the ability in reduction, enlargement and editing, but the operation became complicated and the image processing system has been expensive.

To solve the above problems, it may be considered to supply the image signals read by the image sensor directly to the printer without passing through the computer. Usually, reading of an image is started ahead of an effective image region. That is, reading of the image is started from a blank part before the effective image region. In addition, when reducing the size of the image, as the read image signals are sampled according to a reduction rate and a copying paper size or similarly processed, the starting address of the effective image region cannot be decided automatically when stored in an image memory which is a line memory for interface to supply the read image signals or its reduced image signals to the printer (called merely an image memory hereinafter).

On the other hand, the printer is designed to read the image signals from address 0 of the image memory.

Therefore, in order to directly read out the image signals stored in the image memory from the printer side, it has been necessary to change the starting address of the image memory in which the image signals of the effective image region have been stored; otherwise the image signals can not be supplied correctly to an image region of the printer side.

SUMMARY OF THE INVENTION

This invention is devised to solve the above problems, and hence the copier according to the present invention comprises a means to set an address of image signals in the image memory so that the effective image region among the image signals can be stored at a specified address of the image memory.

A first object of this invention is to provide a copier capable of correctly supplying image signals read by an image reading means directly to an image forming means without resort to a computer, and copying the image on a copying paper.

A second object of this invention is to provide a copier which is small in size because the computer for reduction, enlargement and editing of the image signals to be copied is not needed.

A third object of this invention is to provide a copier capable of coinciding the center of the main scanning direction of the image signals with the center of the copying direction of the copying paper even when setting the reduction rate arbitrarily.

A fourth object of this invention is to provide a copier capable of coinciding the edge of the main scanning direction of the image signals with the edge of the copying direction of the copying paper even when setting the reduction rate arbitrarily.

A fifth object of this invention is to provide a copier capable of copying the image signals on an arbitrary position in the copying paper by means of arbitrarily setting the starting address of the effective image region in the image memory.

The above and further objects and features of the invention will more fully be apparent from the following detailed description with accompanying drawings.

DESCRIPTION OF THE PREFERRED EMBODIMENTS

The present invention is now explained specifically by reference to embodiments.

Figure 1:
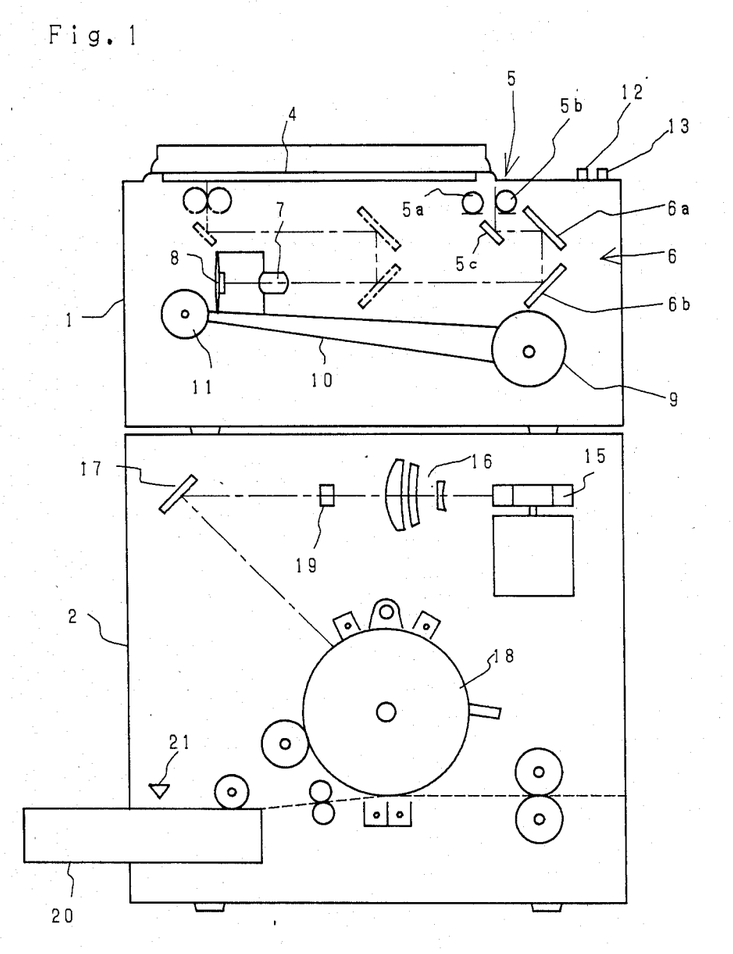
FIG. 1 is a sectional view showing principal composition of the copier according to this invention.

FIG. 1 is a sectional view showing a principal composition of the copier according to this invention. The copier of this invention is composed of an image reading device 1 to read an original and to supply its image signals and a laser printer 2 to copy an image on a copying paper corresponding to the image signals supplied from said image reading device 1.

In the image reading device 1, numeral 4 in the drawing denotes an original glass plate to mount an original on. The image reading device 1 is provided with two scanning optical systems and a first scanning optical system 5 comprises lamps 5a, 5b to light the original and a mirror 5c and a second scanning optical system 6 comprises two mirrors 6a and 6b. Both of the two scanning optical systems 5 and 6 are moved horizontally (from right to left in FIG. 1) by the operation of driving mechanisms 9, 10 and 11 so that the original image should be scanned and, hence the moving speed of the second scanning optical system 6 is half of the moving speed of the first scanning optical system 5.

An image light of the original is reflected by mirror 5c, mirror 6a and mirror 6b in this order and focused on an image sensor 8 by means of a projecting lens 7. The image sensor 8 comprises, for example, a CCD in which multiple pickup elements are arranged in a row. In addition, on an operation panel of the image reading device 1, a reading density selection key 12 to select an image reading density (DPI) and an image reduction rate setting key 13 to set an image reduction rate are mounted.

In such a composition of the image reading device 1, the image light of the original which is mounted on the original glass plate 4 is focused on the image sensor 8 by the projecting lens 7 through the first and the second scanning optical systems 5 and 6 which are moved by the driving mechanisms 9, 10 and 11, and is taken out as image signals.

Referring now to the laser printer 2, numeral 15 in the laser printer 2 indicates a polygonal mirror having plural reflection planes and rotating at a high speed. A laser light emitted from a laser source (not shown) and modulated by the image signals sent from the image reading device 1 is reflected by the polygonal mirror 15. In the running direction of the light reflected by the polygonal mirror 15, a focusing lens 16, an SOS detecting sensor 19 and a reflection mirror 17 are installed and the light reflected by the polygonal mirror 15 is irradiated on a cylindrical photosensitive drum 18 through the focusing lens 16 and the reflection mirror 17.

The SOS detecting sensor 19 is to detect a laser light by every one scanning line and to supply an SOS signal (start of scan signal) which is used for determining the start position of the image to copy in the main scanning direction (the longitudinal direction of the photosensitive drum 18). On the other hand, the photosensitive drum 18 is uniformly charged on the surface by an electric charger, and is rotated centered on the axial center. This rotating direction is the subscanning direction.

Numeral 20 in the drawing indicates a feed cassette to feed copying papers and 21 indicates a paper size sensor composed in said feed cassette to detect the size of copying papers.

In such a composition of laser printer 2, the laser light modulated corresponding to the image signals is scanned in the main scanning direction by means of the polygonal mirror 15, and an electrostatic latent image of the original image is, thus, formed on the photosensitive drum 18. A toner which is a coloring pigment is adhered to this electrostatic latent image so as to develop. As a consequence, after a copying paper is fed from the feed cassette 20, the toner is transferred on the paper surface by tightly pressing the copying paper against the toner adhering plane. The toner is moreover fused by heat to be fixed on the copying paper. and the original is, in this way, copied on the copying paper.

Figure 2:
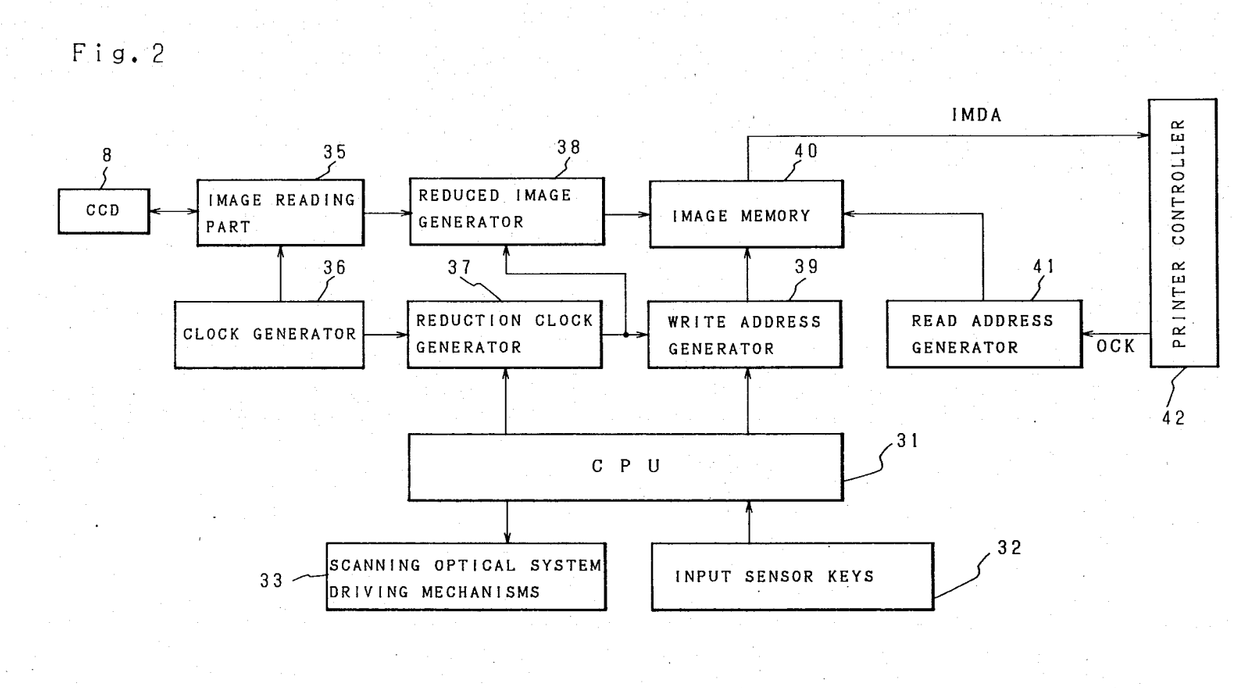
FIG. 2 is a block diagram of principal circuits in the copier of this invention.

FIG. 2 is a block diagram of the control circuit of the copier according to this invention, where numeral 31 indicates a microprocessor (called CPU hereinafter) of which input port is connected with input sensor keys 32 such as the reading density selection key 12 and the image reduction rate setting key 13, and of which output ports are connected with a reduction clock generator 37, a write address generator 39 and scanning optical system driving mechanisms 33 (driving mechanisms 9, 10 and 11) respectively, which are explained later.

And numeral 8 indicates a CCD image sensor for image reading, synchronizing with a clock signal for timing control of image reading sent from a clock generator 36, an image reading part 35 reads the image signals by driving the CCD image sensor 8 and supplies them after converting from analog to digital. The reduction clock generator 37 samples clock signals generated from the clock generator 36 according to image reduction rate data which are supplied from CPU 31, and generates reduction clock signals. A reduced image generator 38 samples image signals which are supplied from the image reading part 35 corresponding to the reduction clock signals, and generates reduction image signals.

The CPU 31 calculates a write starting address of image signals in an image memory 40 according to the set reduction rate and the copying paper size, and the calculated result is supplied to a write address generator 39 composed of preset counters. The write address generator 39 regards the calculated result (write starting address) as a base address and supplies address signals successively to write reduction image signals to the image memory 40 by synchronizing with the reduction clock signals sent from the reduction clock generator 37.

The image memory 40 is a memory to be used for the interface between the image reading device 1 and the laser printer 2, and it has a capacity for one scanning line of the photosensitive drum 18, and stores in the addresses outputted from the write address generator 39 the reduction image signals supplied from the reduced image generator 38. Here, the image memory 40 of this embodiment has a capacity of 8192 bits so that addresses from 0 to 8191 are allocated, and the address is designed to be controlled cyclically as address 0 comes next to address 8191.

A read address generator 41 generates read address signals corresponding to clock signals OCK supplied from a printer controller 42 on the laser printer 2 side, and reads out the image data stored at the address in the image signals IMDA to be copied sequentially from address 0, then sends them out to the printer controller 42.

The operation of this invention is as follows.

Relating to a first embodiment of this invention, to begin with, a case of copying an original image so as to coincide the center of the original image in the main scanning direction with the center of a copying paper in the main scanning direction is described.

The original image for a scanning line in the main scanning direction is read out by the CCD image sensor 8 driven by the image reading part 35 corresponding to a line synchronizing signal, and after being A/D converted, the image signals are sequentially supplied to the reduced image generator 38 in the unit of pixels.

At the same time, reduction clock signals which are formed by sampling the base clock signals are supplied from the reduction clock generator 37, and the reduced image generator 38 successively samples the image signals which are entered from the image reading part 35 in the unit of pixels corresponding to the reduction clock signal and obtains the reduction image signals.

The obtained reduction image signals are stored in the image memory 40 one after another and the address to be stored is decided as described below. That is, when supplying to the laser printer 2, the center line of the copying paper is set so as to coincide with the center line of the effective image region of the reduced image. It is because, as explained before, the outputs of the image signals on the laser printer 2 side are designed to be read out always from address 0 of the image memory 40 with regard to the copy starting position. At this time, in order to change the address in which the beginning image signal of the effective image region among the reduced image signals is stored, the beginning address is calculated by the CPU 31 to determine from which address of the image memory 40 the entered image signals should be written because they contain signals out of the image region before entering the effective image region.

Figure 3:
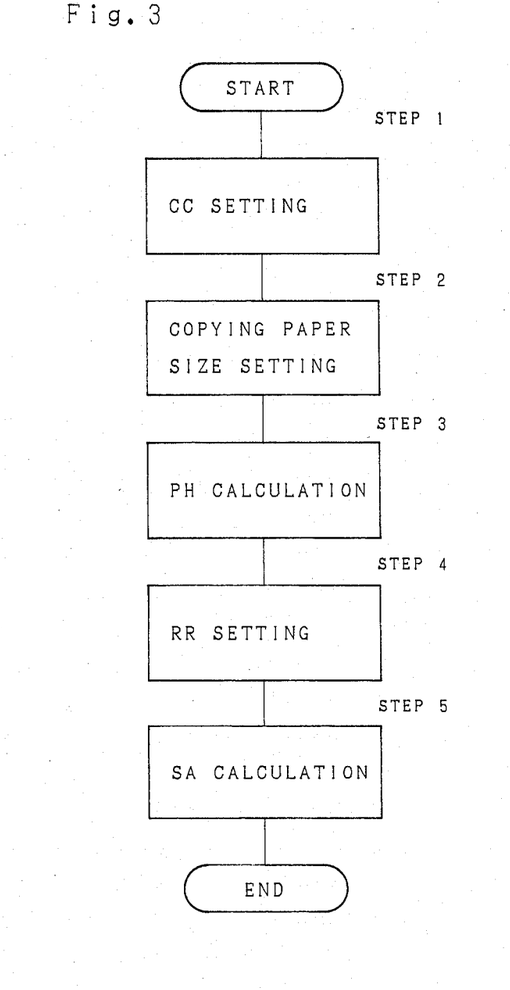
FIG. 3 is a flowchart showing the procedures of calculating the starting address in the copier of this invention.

FIG. 3 is a flowchart of the calculation carried out in the CPU 31. At first, a center line address (CC) of the original image in the main scanning direction is set (STEP 1). After setting the copying paper size (STEP 2), the number of picture elements (PH) from an edge of the copying paper in the main scanning direction to the center line of the paper is calculated (STEP 3). The PH is determined in equation (1) shown below.

$$PH = \text{Reading density (DPI)} \times \text{width of the copying paper}/2 \quad (1)$$

Then after setting an image reduction rate (RR) (STEP 4), write starting address (SA) of the image signals in the image memory 40 is computed (STEP 5). The SA is determined in the following equation (2) or (3).

Figures 5A, 5B, 5C:
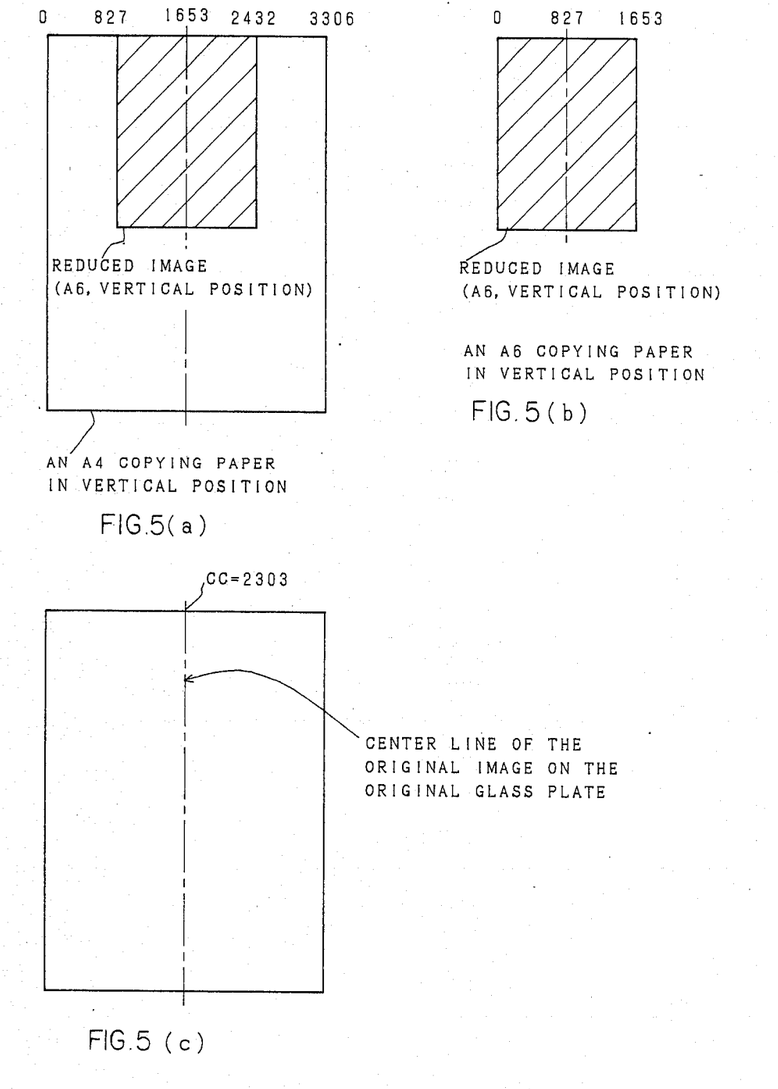
FIGS. 5(a), 5(b) and 5(c) are explanatory drawings of the image and the address in the first embodiment of the copier according to this invention.

When $CC \times RR \geq PH$ (a case shown in FIG. 5(b)), $$SA = N - (CC \times RR - PH) \quad (2)$$

When $CC \times RR < PH$ (a case shown in FIG. 5(a)), $$SA = PH - CC \times RR \quad (3)$$

where N: number of addresses in the image memory 40.

Explaining with a practical example, assuming N=8191, CC=2303, RR=1.0 and PH=1653 (size A4 in vertical position, reading density 400 dots /25.4 mm), it follows that $$SA = 8191 - (2303 \times 1.0 - 1653) = (\text{address}) \, 7541$$

in which the vertical position means the setting of copying paper where the longitudinal direction of the original coincides with the subscanning direction.

Figure 4:
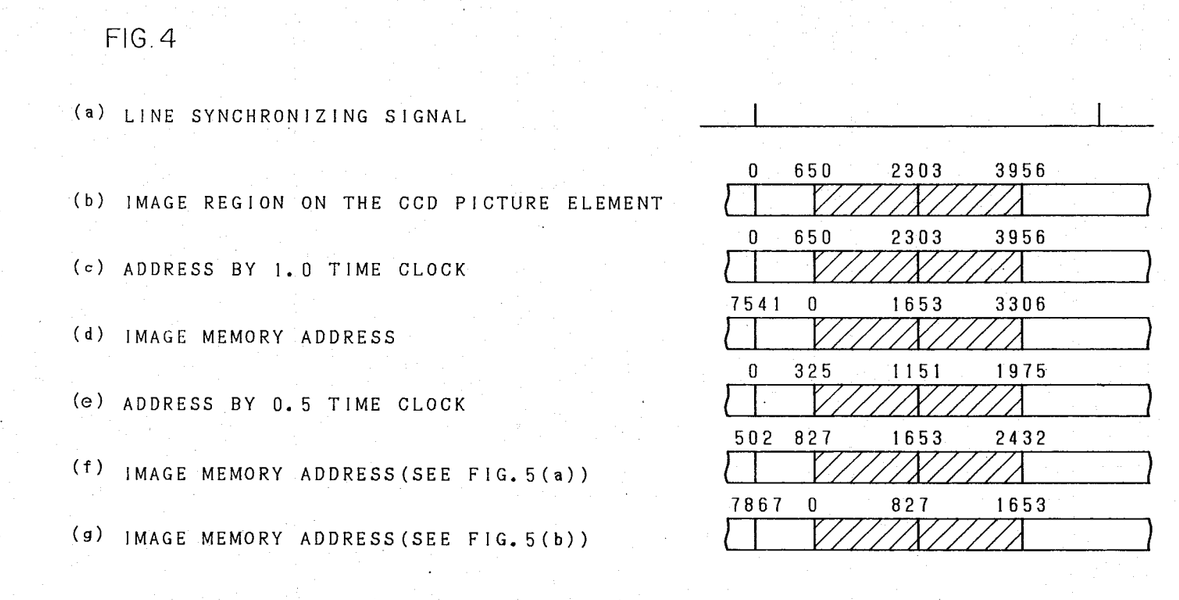
FIG. 4 is an explanatory drawing of the address setting in a first embodiment of the copier according to this invention.

In other words, when an original in size of A4 (210 mm in width) is longitudinally subscanned to be read in the equal size, the CCD 8 supplies image signals for a line in coincidence with a line synchronizing signal (see FIG. 4(a)). At this time, the effective image region on the CCD image is from 650 to 3956 of inside addresses (see FIG. 4(b)). And when writing in the image memory 40, the write starting address SA is 7541 (see FIG. 4(d)).

Next, a case in which the reduction rate RR is 0.5 (that is, ¼ as an area ratio) is explained.

In order to reduce an A4 original in vertical position into an A6 in vertical position and to copy it on an A6 size paper in vertical position, assuming the reading density of the original to be identical.

$PH = 827$ is obtained.

Accordingly, $$SA = 8191 - (2303 \times 0.5 - 827) = (\text{address}) 7867 \text{ (see FIG. 4(g))}.$$

On the other hand, in order to reduce an A4 original in the vertical position into an A6 in vertical position, and copy it on an A4 size paper in vertical position, assuming the reading density of the original to be identical, it results in $PH = 1653$.

As a consequence, because $CC \times RR < PH$, it yields $$SA = 1653 - 2303 \times 0.5 = (\text{address}) 502 \text{ (see FIG. 4(f))}.$$

That is, since the reduction rate RR is 0.5, the inside address 650 to 3956 of the effective image region on the CCD picture elements are reduced by the reduction clock signal to become addresses 325 to 1975 (see FIG. 4(e)).

If the size of the paper to copy is A6 in vertical position, the write starting address becomes address 7867 as calculated before and it means that it is possible to copy the reduced image on an A6 paper in vertical position as shown in FIG. 5(b).

While the size of the paper to print is A4 in vertical position, the write starting address becomes address 502 and the reduced image is supplied on the middle part of the A4 paper in vertical position as shown in FIG. 5(a).

In FIG. 5(c), the center line address of the original which is the original center position on the original glass plate 4 is shown.

As is obvious from the above explanation, especially from that concerning FIG. 5(b), it is possible to supply the image on an arbitrary size of paper without using a paper according to the reduction rate of the original, and furthermore, in this case, it is possible to determine the reduction rate arbitrarily.

As the write starting address to write the beginning image signal is determined in the above process, the write address signals are supplied one by one from the write address generator 39 corresponding to the write starting address and the reduction clock signals, and the image signals are successively written in the specified addresses in the image memory 40.

Speaking of the parameters necessary for the calculation in the CPU 31 stated above, for example, the center line address CC of the original in the main scanning direction is entered from an original size reading sensor (not shown), and the number of picture elements PH from an edge of the copying paper in the main scanning direction to the center line of the paper is determined by signals entered from the reading density selection key 12 on the operation panel and the paper size sensor 21 composed in the paper feed cassette 20. The image reduction rate RR is also entered from the image reduction rate setting key 13 on the operation panel. The number of addresses N in the image memory 40 is a value determined by the image memory 40 so that 8191 is a fixed value.

Referring next to a second embodiment, a case to copy the original image at a corner of the print paper is explained.

In the second embodiment, since the processings of reading the image and reducing its size are the same as those in the first embodiment, the explanation of these processes are therefore omitted and the calculating method of the write starting address (SA) of the image signals in the image memory 40 is explained hereinafter.

The SA is, in the second embodiment, calculated in equation (4) or (5).

When $OS \times RR \geq IS$, $$SA = N - (OS \times RR - IS) \quad (4)$$

When $OS \times RR < IS$, $$SA = IS - OS \times RR \quad (5)$$

where
- OS: address of the beginning image signal of the effective image region;
- IS: address of the beginning image on the copying paper; and
- N and RR are identical with those used in the above first embodiment respectively.

Figure 6:
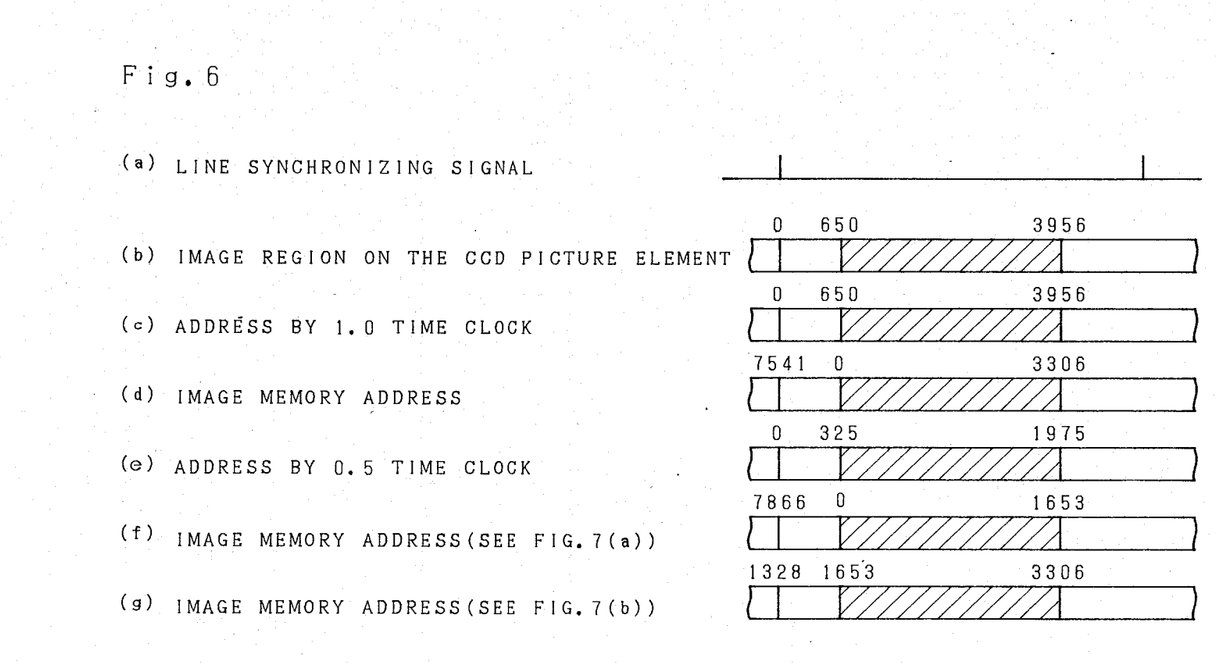
FIG. 6 is an explanatory drawing of the address setting in a second embodiment of the copier according to this invention.
Figure 7A:
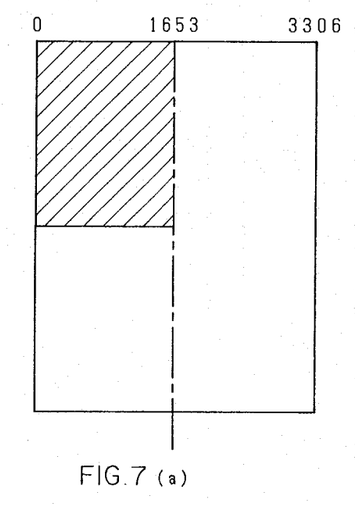
FIGS. 7(a) and 7(b) are explanatory drawings of the image and the address in the second embodiment of the copier according to this invention.
Figure 7B:
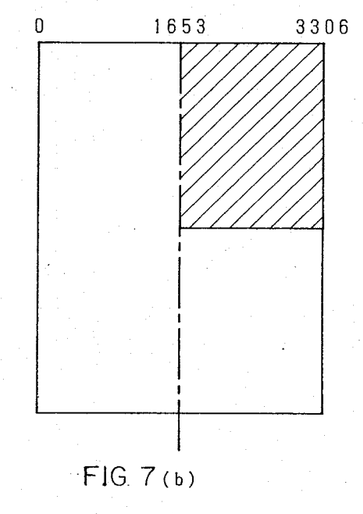

Explaining practically a case of reducing an A4 original by 0.5 times and copying on an A4 copying paper, the values become N=8191, OS=650 and RR=0.5. Besides, when copying the image at the edge of the beginning side in the writing-out direction (main scanning direction), because IS=0, it follows that $$SA = 8191 - (650 \times 0.5 - 0) = (address) 7866 \text{ (see FIG. 6(f))}.$$

And when copying the image at the edge of the rear end side in the writing-out direction, because IS=1653, it follows that $$SA = 1653 - (650 \times 0.5) = (address) 1328 \text{ (see FIG. 6(g))}.$$

After the write starting address to write the beginning image signal in the image memory 40 is determined in this way, the image signals are written in the specified addresses in the image memory 40 one by one. The writing operation is the same as that in the first embodiment, and its explanation is here omitted.

In the second embodiment, if designing a structure capable of setting the IS value arbitrarily by an operator's key operation on the panel, it becomes possible to copy the image on an arbitrary position on the copying paper by calculating the SA while using the preset IS value and said equation (4) or (5).

In the above embodiments, the reduction of the image in the main scanning direction is described, whereas the reduction in the subscanning direction may be carried out by adjusting the moving speed in the subscanning direction of the scanning optical system according to the reduction rate.

As described above in details, by using the copier of this invention, it is possible to supply the image signals read out by the image reading device directly to the laser printer without resort to a large-sized storage memory such as bit map memory, and to copy the image signals on a copying paper.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A copier comprising:
    an image reading means to read an original image by linearly arrayed multiple image pickup elements, of which arrayed direction is the main scanning direction and the direction crossing the arrayed direction is subscanning direction, and to generate image signals corresponding to said original image;
    a reduction clock pulse generating means to divide a base clock pulse into reduction clock pulses according to a preset reduction rate;
    a reduction image signal generating means to sample image signals from said image reading means corresponding to said reduction clock pulses, and to generate reduction image signals;
    an image memory to store said reduction image signals from said reduction image signal generating means;
    a write address calculating means to calculate a write address of the reduction image signals in said image memory in accordance with said reduction rate and copying paper size;
    a writing means to write the reduction image signals in said image memory corresponding to the calculated write address;
    a read-out means to sequentially read out the reduction image signals written in said image memory from the specified address; and
    an image forming means to form the reduced image on the copying paper corresponding to the reduction image signals read out by said read-out means.

2. A copier as set forth in claim 1, wherein said image reading means contains a linear image sensor.

3. A copier as set forth in claim 1, wherein said write address calculating means contains a preset counter.

4. A copier as set forth in claim 1, wherein said write address calculating means calculates the write address of the reduction image signals so as to coincide the center of the original image in the main scanning direction with the center of the copying paper in the main scanning direction.

5. A copier as set forth in claim 4, wherein said write address calculating means calculates the write address of the beginning reduction image signal in the image memory, and said writing means writes the reduction image signals in the image memory sequentially from the write address of this beginning reduction image signal.

6. A copier as set forth in claim 5, wherein said write address calculating means calculates the write address of said beginning reduction image signal according to the following equation (6) or (7).

When $CC \times RR \geq PH$, $$SA = N - (CC \times RR - PH) \quad (6)$$

When $CC \times RR < PH$, $$SA = PH - CC \times RR \quad (7)$$

where
- N: number of addresses in the image memory;
- CC: center line address of the original image in the main scanning direction;
- RR: image reduction rate;
- PH: number of picture elements of the copying paper in the main scanning direction from an edge to the center line; and
- SA: write address of the beginning reduction image signal.

7. A copier as set forth in claim 1, wherein said write address calculating means calculates the write address of the reduction image signal so as to coincide an edge of the reduced image in the main scanning direction with an edge of the copying paper in the main scanning direction.

8. A copier as set forth in claim 7, wherein said write address calculating means calculates the write address of the beginning reduction image signal in the image memory, and said writing means writes the reduction image signals in the image memory sequentially from the write address of this beginning reduction image signal.

9. A copier as set forth in claim 8, wherein said writing address calculating means calculates the write address of said beginning reduction image signal according to the following equation (8) or (9).

When $OS \times RR \geq IS$, $$SA = N - (OS \times RR - IS) \quad (8)$$

When $OS \times RR < IS$, $$SA = IS - OS \times RR \quad (9)$$

where
- N: number of addresses in the image memory;
- OS: address of the beginning image signal in the effective image region (actual original image region);
- RR: image reduction rate;
- IS: address of the beginning image in the copying paper; and
- SA: write address of the beginning reduction image signal.

10. A copier as set forth in claim 9, being provided with a setting means to set said IS optionally.

* * * * *